United States Patent [19]
Tanaka

[11] Patent Number: 6,100,950
[45] Date of Patent: Aug. 8, 2000

[54] ACTIVE MATRIX LCD WITH THIN FILM TRANSISTOR SWITCHES AND METHOD OF PRODUCING THE SAME

[75] Inventor: Hiroaki Tanaka, Tokyo, Japan

[73] Assignee: NEC Corporation, Tokyo, Japan

[21] Appl. No.: 09/013,901

[22] Filed: Jan. 27, 1998

[30] Foreign Application Priority Data

Jan. 28, 1997 [JP] Japan ................................. 9-014226

[51] Int. Cl.⁷ ........................ G02F 1/136; G02F 1/1343
[52] U.S. Cl. ............................ 349/47; 349/143; 430/30
[58] Field of Search .......................... 349/47, 147, 42, 349/143; 430/30, 149, 738, 739; 257/59, 72

[56] References Cited

U.S. PATENT DOCUMENTS

| | | | |
|---|---|---|---|
| 4,697,331 | 10/1987 | Boulitrop et al. | 438/161 |
| 5,229,873 | 7/1993 | Hirose et al. | 349/146 |
| 5,728,592 | 3/1998 | Oki et al. | 438/161 |
| 5,858,807 | 1/1999 | Kawamura | 438/30 |

FOREIGN PATENT DOCUMENTS

| | | |
|---|---|---|
| 57-85247 | 5/1982 | Japan. |
| 1-179345 | 7/1989 | Japan. |
| 6-160906 | 6/1994 | Japan. |
| 2501411 | 3/1996 | Japan. |

*Primary Examiner*—Kenneth Parker
*Attorney, Agent, or Firm*—Young & Thompson

[57] ABSTRACT

An active matrix LCD (Liquid Crystal Display) using thin film transistors as switching devices and a method of producing the same are disclosed. When a drain bus line and a pixel electrode are to be formed, a transparent conductive film and a low resistance metal film are sequentially laminated in a double layer structure. Only the metal film is removed from the pixel electrode by side etching effected via holes formed in the pixel electrode. This allows a low resistance drain bus line and a transparent pixel electrode to be formed by a single photolithographic step. As a result, the wiring resistance of the LCD can be lowered without increasing the number of times of photolithography, allowing the LCD to be provided with a wide screen.

16 Claims, 10 Drawing Sheets

Fig. 10C

ACTIVE MATRIX LCD WITH THIN FILM TRANSISTOR SWITCHES AND METHOD OF PRODUCING THE SAME

BACKGROUND OF THE INVENTION

The present invention relates to an active matrix type LCD (Liquid Crystal Display) using thin film transistors as switching devices, and a method of producing the same and, more particularly, to an active matrix LCD capable of lowering wiring resistance without increasing the number of photolithography steps, and a method of producing the same.

Thin film transistors implemented by amorphous or polycrystalline silicon, CdSe or similar semiconductor are attracting increasing attention as switching devices for use in an active matrix LCD. An LCD using such thin film transistors as switching devices is disclosed in, e.g., Japanese Patent Publication No. 2501411 corresponding to Japanese Patent Laid-Open Publication No. 6-160906. However, a wide screen or high definition is not achievable with the LCD taught in the above document for the following reason. Because a pixel electrode and a drain bus line are formed by a single photolithographic step, the drain bus line must be implemented by a transparent conductive film whose resistance is several ten times as high as the resistance of a metal film, e.g., ITO (Indium Tin Oxide) having about twenty times higher volume resistivity in terms of ITO/Cr. While this problem may be solved if a low resistance metal film is provided above or below the rain bus line, this kind of scheme is not practicable without resorting to one or more photolithographic steps. An increase in the number of photolithographic steps directly translates not only into an increase in the number of indirect members and an increase in the number of times of use of apparatuses, but also results in a decrease in yield which would noticeably increase the cost. It is therefore necessary to lower wiring resistance without increasing the number of photolithographic steps.

Technologies relating to the present invention are also disclosed in, e.g., Japanese Patent Laid-Open Publication Nos. 57-85247, 1-179345, and 6-160906.

SUMMARY OF THE INVENTION

It is therefore an object of the present invention to provide an active matrix LCD using thin film transistors as switching devices and capable of lowering wiring resistance without increasing the number of photolithographic steps, and a method producing the same.

In accordance with the present invention, an active matrix LCD using thin film transistors as switching devices includes a drain electrode formed by a transparent conductive film and a low resistance metal film sequentially laminated in this order, a drain bus line connected to the drain electrode, a source electrode, and a pixel electrode connected to the source electrode and formed with a number of holes. The low resistance metal film is removed from the pixel electrode. A gate electrode is formed on the transparent conductive film and low resistance metal film in the form of an island. A gate bus line is connected to the gate electrode. A semiconductor layer and an insulation film identical in configuration with the gate bus line are formed. The gate bus line is formed of low resistance metal and connected to the gate electrode.

Also, in accordance with the present invention, a method of producing an active matrix LCD has the steps of sequentially forming a transparent conductive film and a low resistance metal film on an insulative substrate in this order, forming a drain electrode, a drain bus line connected to the drain electrode, a source electrode, and a pixel electrode connected to the source electrode and formed with a number of holes, removing only the low resistance metal film from the pixel electrode by side etching, executing phosphine ($PH_3$) plasma processing on the substrate, and then sequentially forming a semiconductor film, an insulating film and a low resistance metal film in this order, forming a gate electrode and a gate bus line connected to the gate electrode by patterning, and forming an island identical in configuration with the gate electrode and gate bus line.

Further, in accordance with the present invention, an active matrix LCD using thin film transistors as switching devices includes a gate electrode implemented by a low resistance metal film and a gate bus line connected to the gate electrode. An insulating film, a semiconductor film and a contact layer are formed on the low resistance metal film in the form of an island and so configured as to cover at least the gate electrode and a portion where the gate bus line and a drain bus line are expected to cross each other. A transparent conductive film and a low resistance metal film are sequentially laminated in this order in order to form a drain electrode connected to the drain bus line. A pixel electrode is connected to the source electrode and formed with a number of holes. Only the low resistance metal film is removed from the pixel electrode.

Moreover, in accordance with the present invention, a method of producing an active matrix LCD has the steps of forming a low resistance metal film on an insulative substrate, forming a gate electrode and a gate bus line connected to the gate electrode by patterning, forming an insulating film, a semiconductor film and a contact layer on the substrate, forming by patterning an island covering at least the gate electrode and a portion where the gate bus line and a drain bus line are expected to cross each other, sequentially forming a transparent conductive film and a low resistance metal film on the substrate in this order, forming by patterning the drain bus line connected to the drain electrode, a source electrode, and a pixel electrode connected to the source electrode and formed with a number of holes, removing only the low resistance metal film from the pixel electrode by side etching, and removing the contact layer from a channel portion.

BRIEF DESCRIPTION OF THE DRAWINGS

The above and other objects, features and advantages of the present invention will become more apparent from the following detailed description taken with the accompanying drawings in which.

In the drawings, identical references denote identical structural elements.

DESCRIPTION OF THE PREFERRED EMBODIMENTS

To better understand the present invention, brief reference will be made to a conventional active matrix LCD.

FIGS. 1A, 1B, 2A and 2B demonstrate a sequence of steps for the fabrication of a substrate circuit for the active matrix LCD and using switching devices implemented by thin film transistors.

Figure 1A:
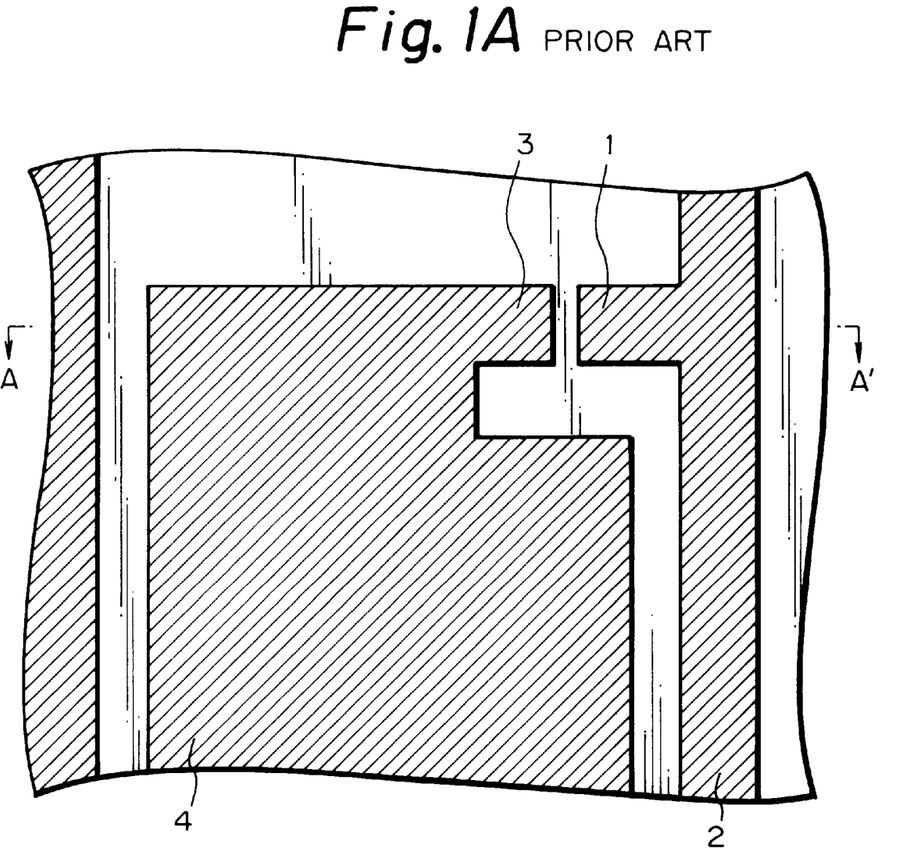
FIG. 1A is a plan view showing the initial step of producing a conventional active matrix LCD.
Figure 1B:
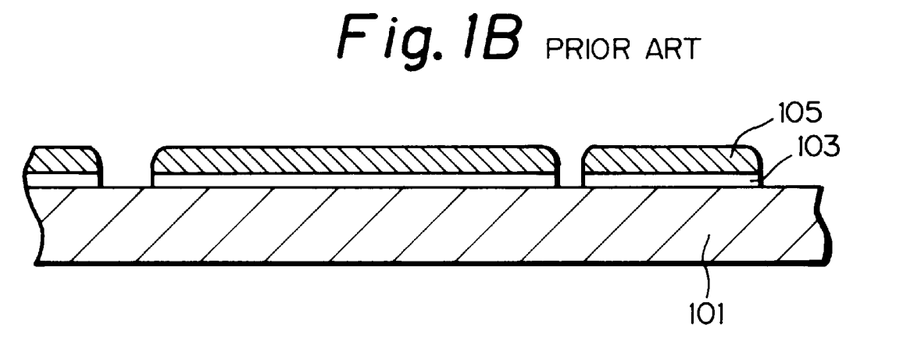
FIG. 1B is a section along line A–A' of FIG. 1A.

First, as shown in FIGS. 1A and 1B, an ITO or similar transparent conductive film 103 is formed on an insulative substrate 101 by sputtering. The conductive film 103 is patterned by photolithography and wet or dry etching in order to form a drain electrode 1, a drain bus line 2 connected to the drain electrode 1, a source electrode 3 and a pixel electrode 4 connected to the source electrode 3. Photoresist 105 is used for the patterning purpose, as indicated by hatching in FIGS. 1A and 1B.

Figure 2A:
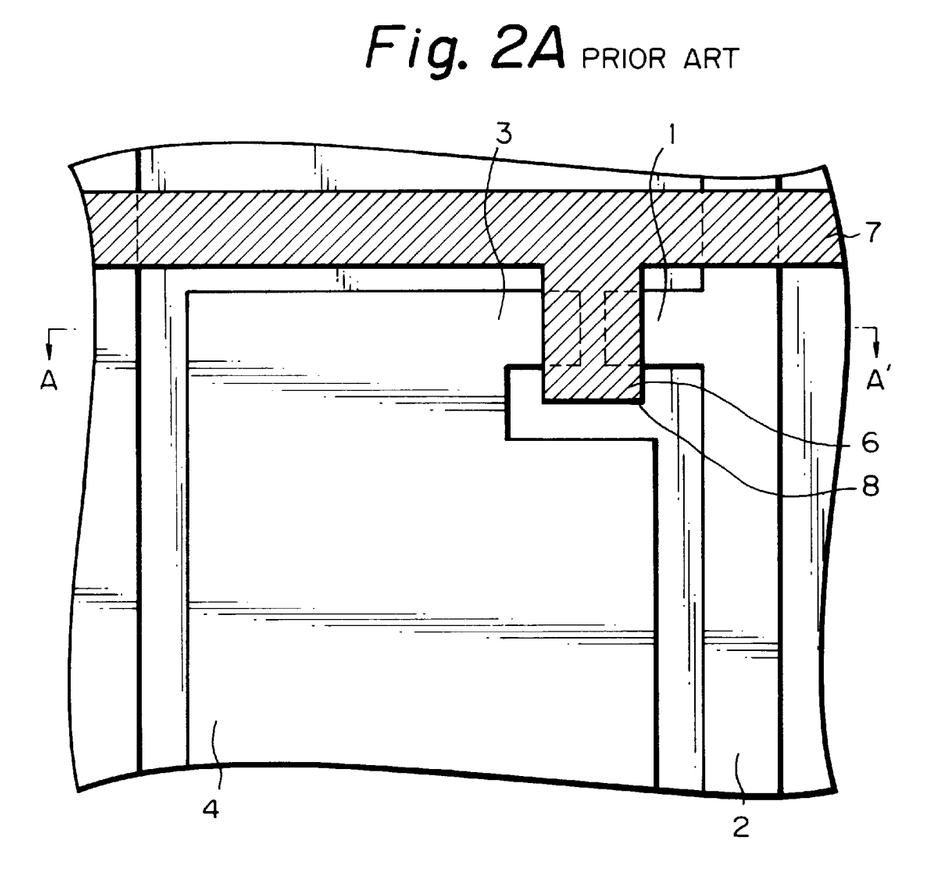
FIG. 2A is a plan view showing a step following the step of FIG. 1A.
Figure 2B:
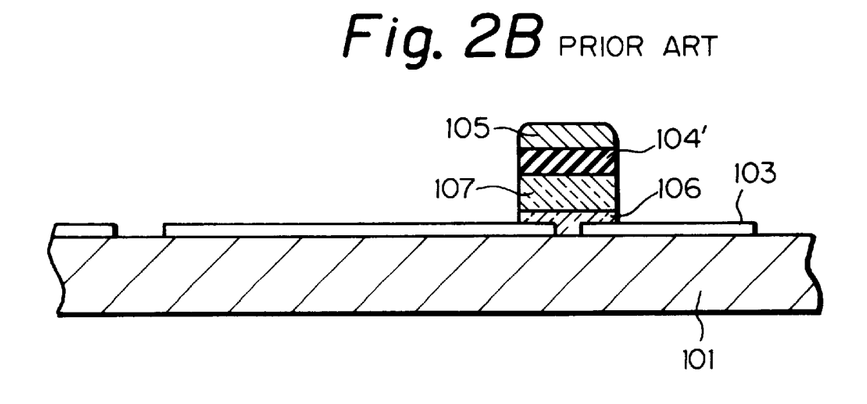
FIG. 2B is a section along line A–A' of FIG. 2B.

Subsequently, as shown in FIGS. 2A and 2B, an amorphous silicon (a-Si) or similar semiconductor film 106 formed by plasma CVD (Chemical Vapor Deposition), a silicon nitride (SiN) or similar insulating film 107, and a chromium (Cr) or similar low resistance metal film 104' formed by sputtering are sequentially laminated on the substrate 101 by photolithography and wet or dry etching. The films 106, 107 and 104' are patterned to implement a gate electrode 6, a gate bus line 7 connected to the gate electrode 6, and an island 8 having the same configuration as the gate electrode 6 and gate bus line 7.

The problem with the above conventional LCD is that wiring resistance must be reduced without increasing the number of times of photolithography, as discussed earlier.

Figure 3A:
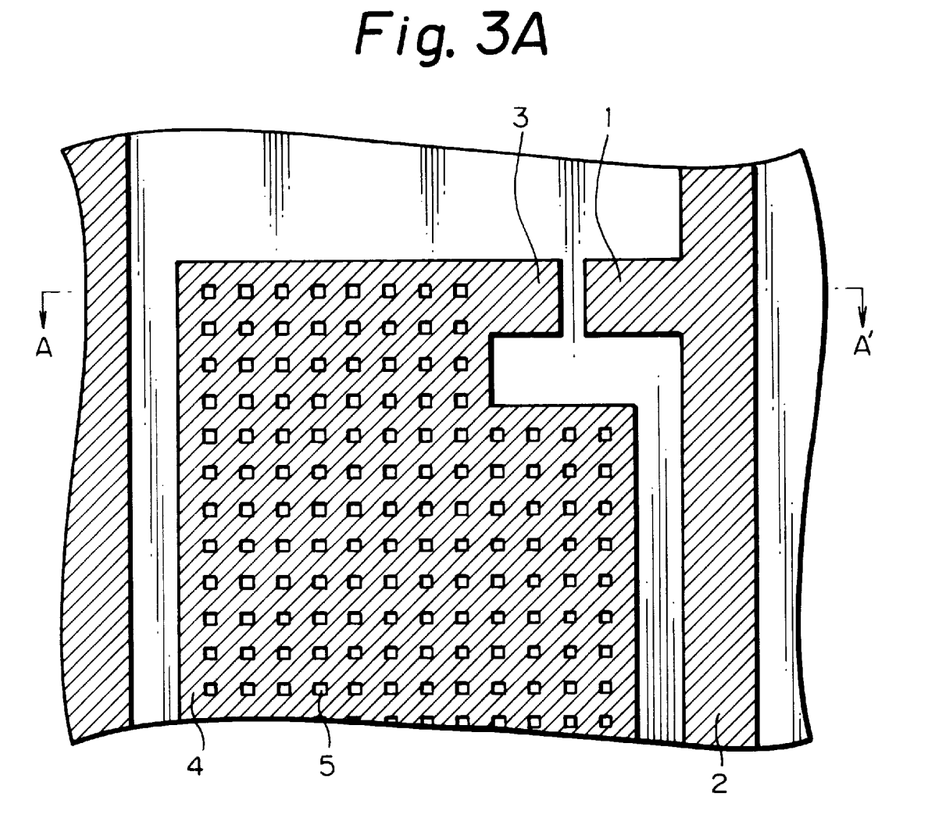
FIGS. 3A, 4A, 5A are plan views showing a sequence of steps for producing an active matrix LCD embodying the present invention.
Figure 3B:
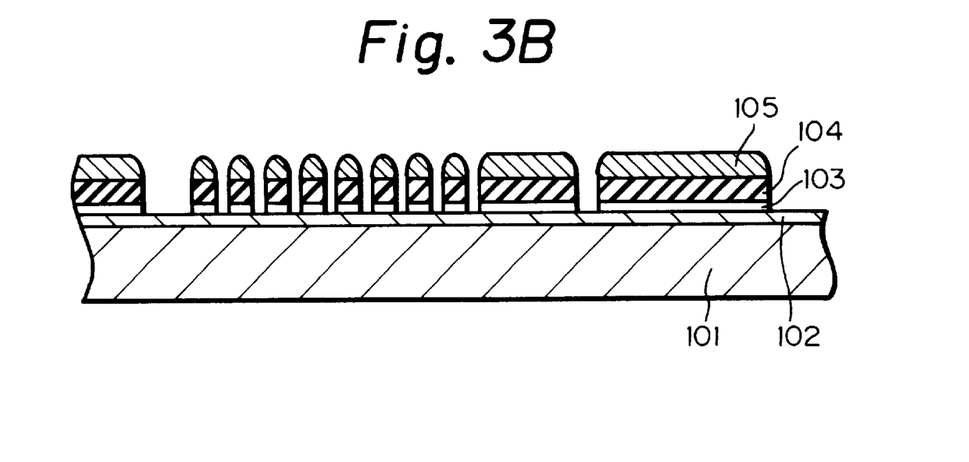
FIGS. 3B, 4B and 5B are sections along lines A–A' of FIGS. 3A, 4A and 5A, respectively.
Figure 4A:
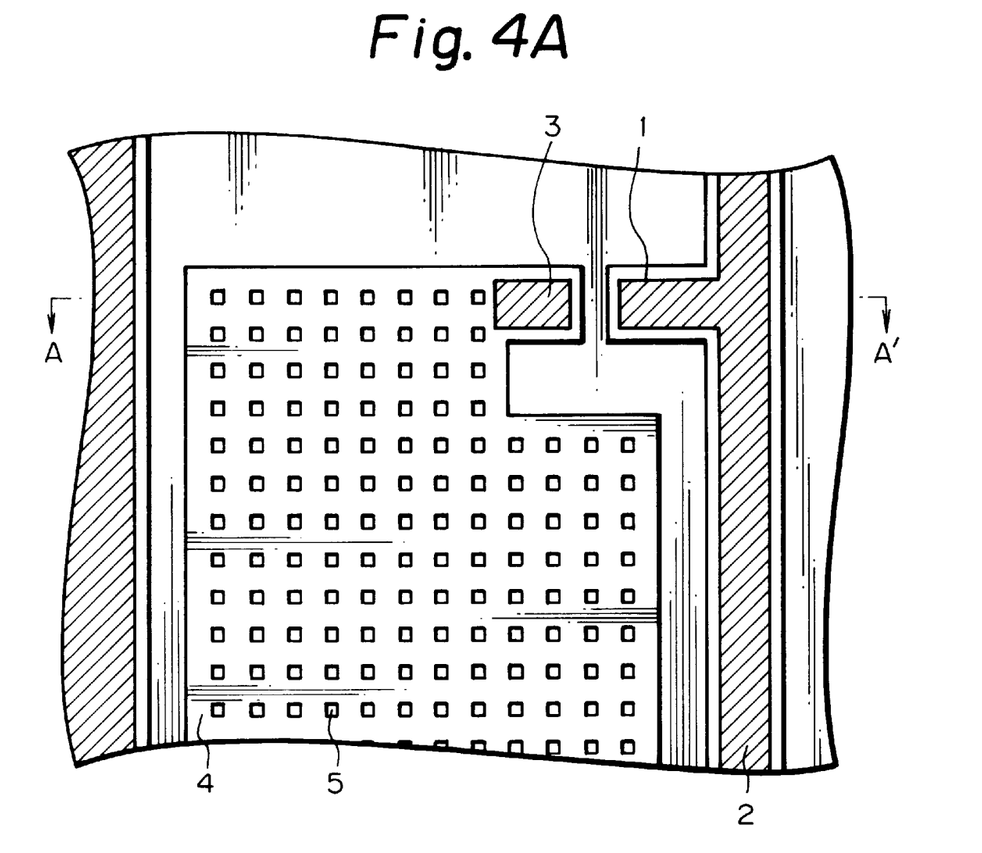
Figure 4B:
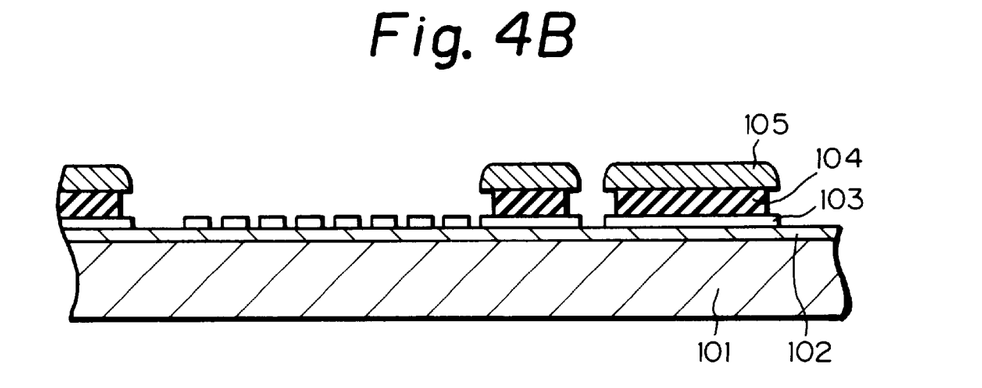
Figure 5A:
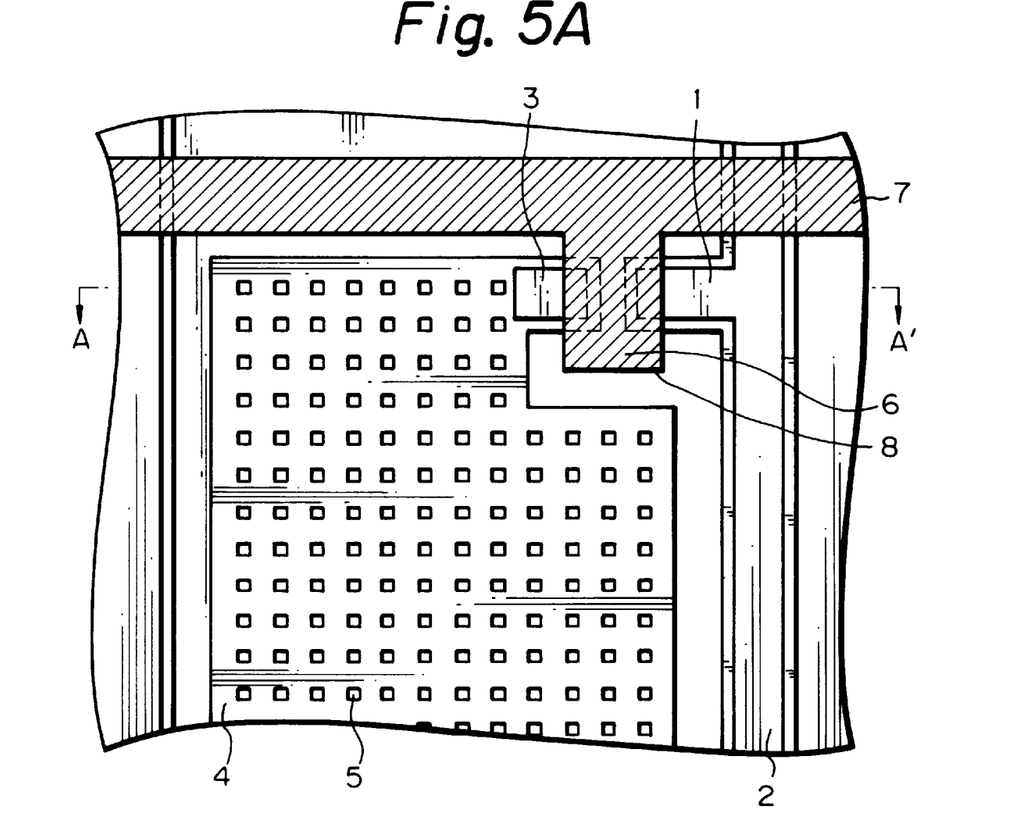
Figure 5B:
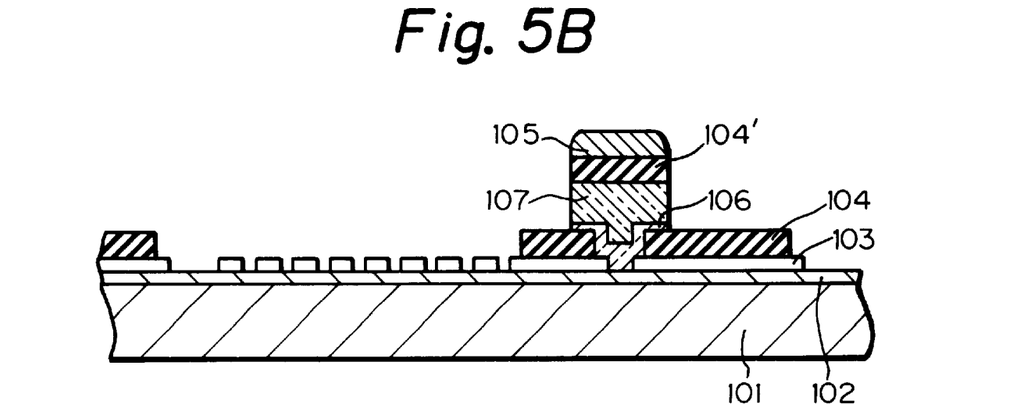

Referring to FIGS. 3A, 3B, 4A, 4B, 5A and 5B, an active matrix LCD embodying the present invention will be described which also has thin film transistors as switching devices. As shown, the LCD includes an insulative substrate 101 on which a transparent insulating film 102 is formed. A transparent conductive film 103 and a low resistance metal film 104 are sequentially laminated on the insulating film 102 in a pattern forming a drain electrode 1, a drain bus line 2 connected to the drain electrode 1, a source electrode 3 and a pixel electrode 4 connected to the source electrode 3 and having a number of holes 5. A semiconductor layer 106 and an insulating layer 107 are sequentially formed on the metal film 104 in the form of an island 8 identical in configuration with a gate electrode 6 and a gate bus line 7 connected to the electrode 6. A low resistance metal film 104' is formed on the insulating layer 107 in the form of the gate electrode 6 and gate bus line 7. In FIGS. 5A and 5B, the reference numeral 105 designates photoresist. The photoresist 105 is indicated by hatching in FIGS. 3A and 5A. Further in FIG. 4A, the low resistance metal film 104 is indicated by hatching.

A method of producing the LCD having the above configuration is generally made up of a first and a second step. The first step consists in sequentially forming the transparent insulating film 102, transparent conductive film 103 and low resistance metal film 104 on the substrate 101, patterning the films 103 and 104 in order to form the drain electrode 1, drain bus line 2, source electrode 3, and pixel electrode 4, and removing only the film 104 from the pixel electrode 4 by side etching. The second step following the first step consists in effecting phosphine ($PH_3$) plasma processing on the substrate 101, forming the semiconductor film 106 and insulating film 107 and a low resistance metal film 104', forming the gate electrode 6 and gate bus line 7 by patterning, and forming the island 8 identical in configuration with the gate electrode 6 and gate bus line 7.

The first step will be described specifically with reference to FIGS. 3A, 3B and 4A and 4B. As shown in FIGS. 3A and 3B, the transparent insulating film 102 which is 100 nm thick and formed of, e.g., silicon oxide ($SiO_2$), transparent conductive film 103 which is 50 nm thick and formed of, e.g., ITO, and low resistance metal film 104 which is 150 nm thick and formed of, e.g., Cr are sequentially formed on the substrate 101 formed of, e.g., glass. Then, the drain electrode 1, drain bus line 2, source electrode 3 and pixel electrode 4 are formed by photolithography using the photoresist 105 and ITO dry etching. The holes 5 of the pixel electrode 5 are 1 μm square each and spaced from each other by 3 μm. The distance and size of the holes 5 is selected such that at the time of the following side etching, Cr on the pixel electrode 4 is removed, but Cr on the drain bus line 2 has its wiring resistance protected from the influence of side etching. As shown in FIGS. 4A and 4B, 1.5 μm side etching implemented by Cr wet etching is executed in order to remove only Cr only from the pixel electrode 4. At this time, the photoresist 105 on the pixel electrode 4 is lifted off and removed. Although Cr on, e.g., the drain electrode 1 recedes by 1.5 μm, such receding does not matter at all.

FIGS. 5A and 5B show the second step following the above first step. As shown, $PH_3$ plasma processing is executed on the substrate 101 undergone the first step. Then, the semiconductor film 106 which is 50 nm thick and formed of, e.g., a-Si and the insulating film 107 which is 300 nm thick and formed of, e.g., SiN are formed by plasma CVD. The low resistance metal film 104' which is 150 nm thick and formed of, e.g., Cr is laminated on the insulating film 107 by sputtering. Subsequently, the gate electrode 6 and gate bus line 7 are formed by photolithography and Cr wet etching. Finally, the island 8 identical in configuration with the gate electrode 6 and gate bus line 7 is formed by SiN/a-Si dry etching.

As stated above, the illustrative embodiment executes photolithography twice in order to produce an active matrix substrate circuit whose switching devices are implemented by low resistance wiring, forward stagger type thin film transistors.

Figure 10A:
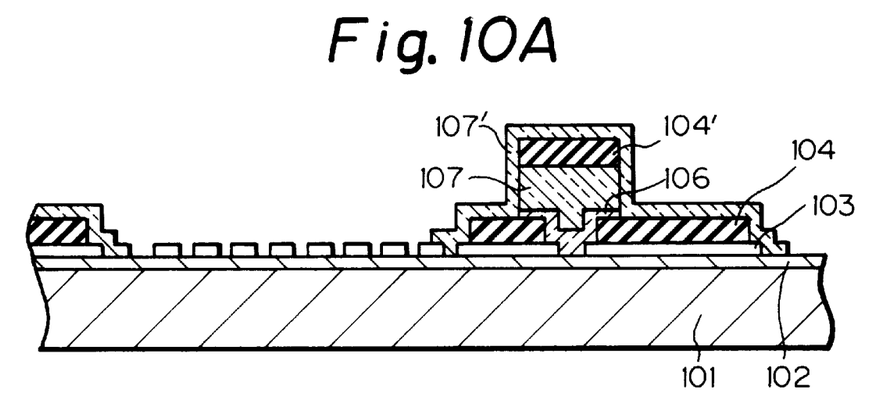
FIGS. 10A–10C are sections each showing a specific modification of the embodiment shown in FIGS. 3A–5B.
Figure 10B:
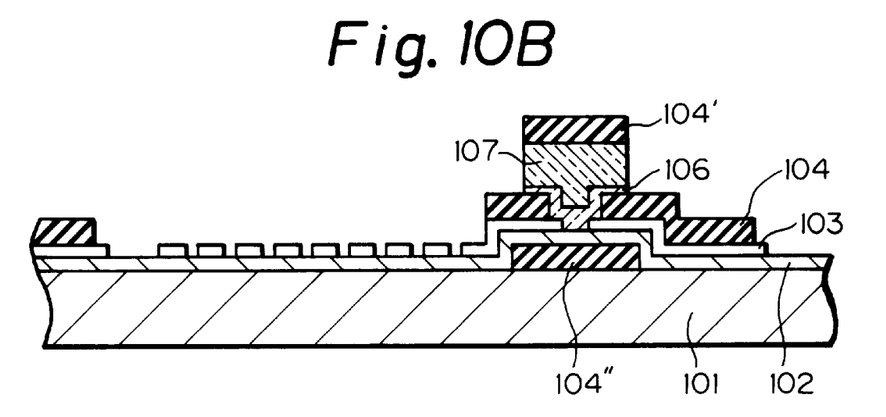
Figure 10C:
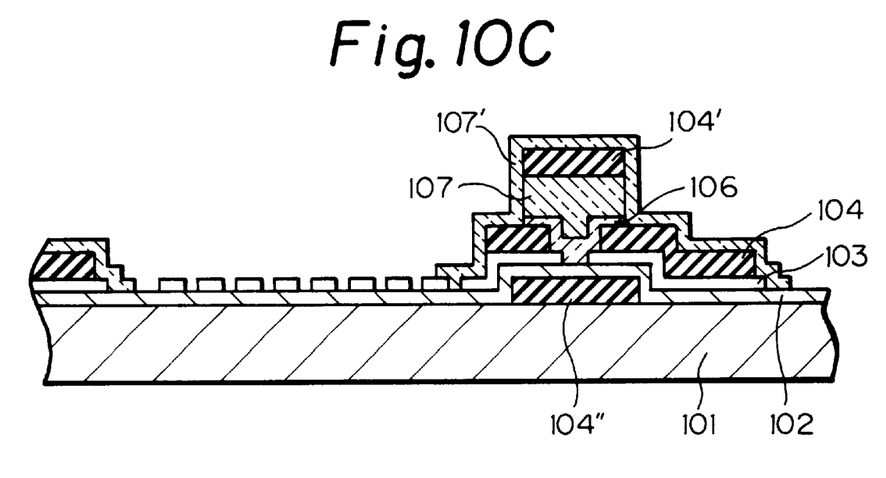

As shown in FIG. 10A, a passivation film implemented by an SiN or similar insulating film 107' (200 nm thick) may be added to the LCD completed by the above two consecutive steps. Alternatively, as shown in FIG. 10B, a black matrix formed of Cr or similar low resistance metal 104" (150 nm thick) may be added before the substrate of the illustrative embodiment is formed. If desired, both the insulating film 107' and low resistance metal 104" may be added, as shown in FIG. 10C.

An alternative embodiment of the present invention also having thin film transistors as switching devices will be described with reference to FIGS. 6A, 6B, 7A, 7B, 8A, 8B, 9A and 9B. As shown, an LCD includes the low resistance metal film 104' forming the gate electrode 6 and gate bus line 7 connected to the electrode 6. The island 8 is formed on the metal film 104' and made up of the insulating film 107 and semiconductor film 106 and a contact layer 108. The films 107 and 106 and layer 108 are so configured as to cover at least the gate electrode 6 and a portion where the gate bus line 7 and drain bus line 2 are expected to cross each other. Subsequently, the transparent conductive film 103 and low resistance metal film 104 forming the drain electrode 1, drain bus line 2, source electrode 3 and pixel electrode 4 are sequentially laminated. The pixel electrode 4 has a number of holes 5 while the low resistance metal film is removed from the electrode 4.

A method of producing the above LCD is generally made up of a first, a second and a third step, as follows. The first step consists in forming the low resistance metal film 104' on the substrate 101, and patterning the metal film 104' in order to form the gate electrode 6 and gate bus line 2 connected to the electrode 6. The second step consists in forming the insulating film 107, semiconductor film 106 and contact layer 108 on the substrate 101, and patterning them in order to form the island 8 so configured as to cover at least the gate electrode 6 and the portion where the gate bus line 7 and drain bus line 2 are expected to cross each other. The third step consists in forming the transparent conductive film 103 and low resistance metal film 104 on the substrate 101, patterning them in order to form the drain electrode 1, drain bus line 2 connected to the electrode 2, source electrode 3, and pixel electrode 4 connected to the electrode 3 and including the holes 5, removing the only metal film 104' from the pixel electrode 4 by side etching, and then removing the contact layer 108 from the channel portion.

Figure 6A:
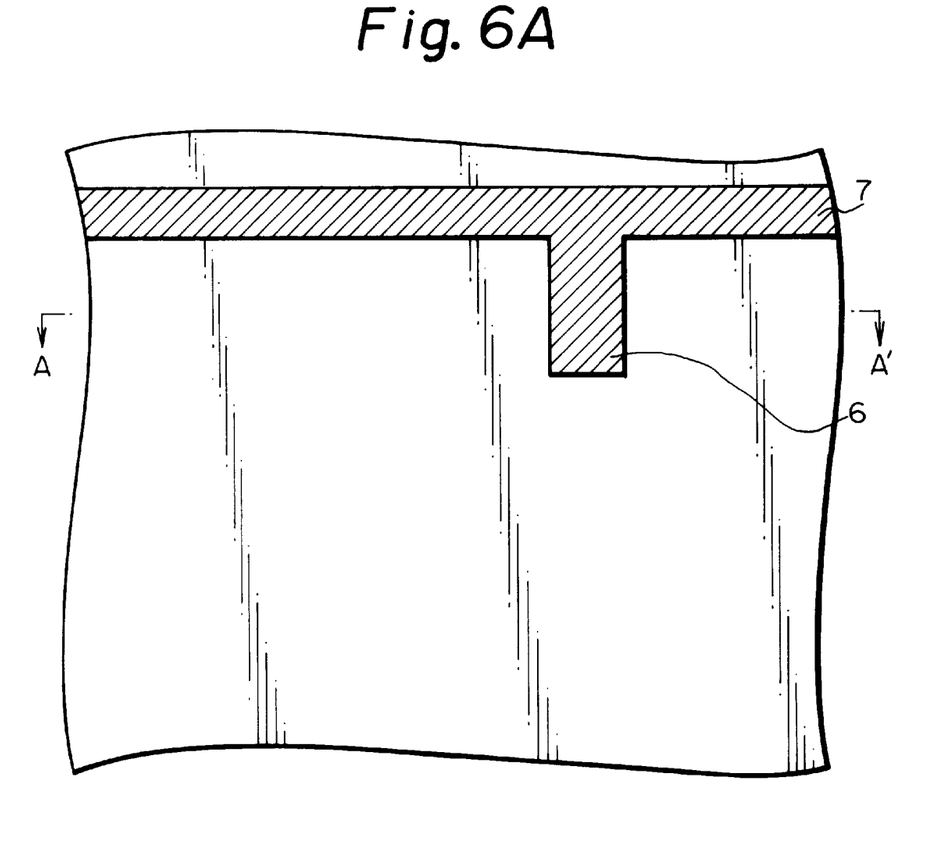
FIGS. 6A, 7A, 8A and 9A are plan views showing a sequence of steps representative of an alternative embodiment of the present invention.
Figure 6B:
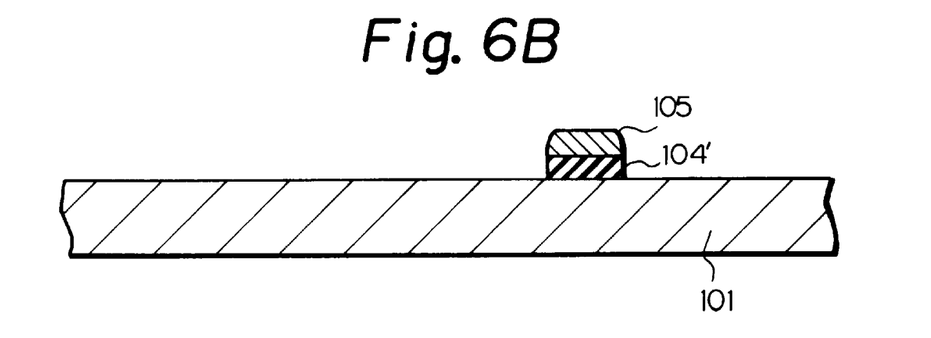
FIGS. 6B, 7B, 8B and 9B are sections along lines A–A' of FIGS. 6A, 7A, 8A and 9A, respectively.

FIGS. 6A and 6B demonstrate the first step specifically. As shown, the Cr or similar low resistance metal film 104' (150 nm thick) is formed on the glass or similar insulative substrate 101. Then, the gate electrode 6 and gate bus line 7 are formed by photolithography using the photoresist 105 and Cr wet etching.

Figure 7A:
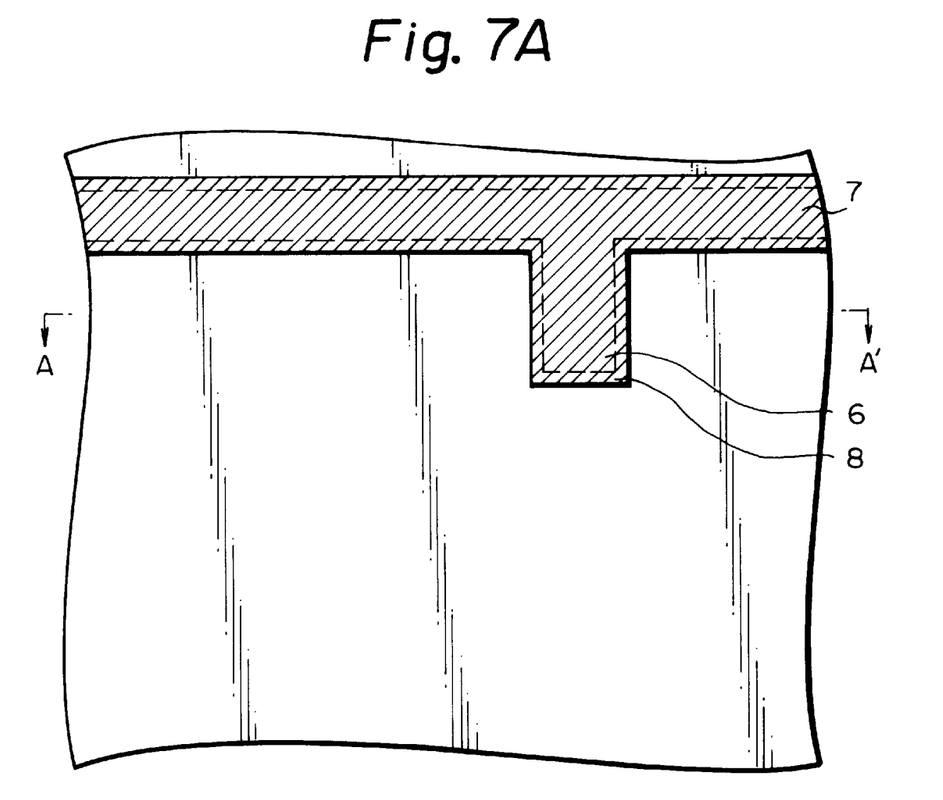
Figure 7B:
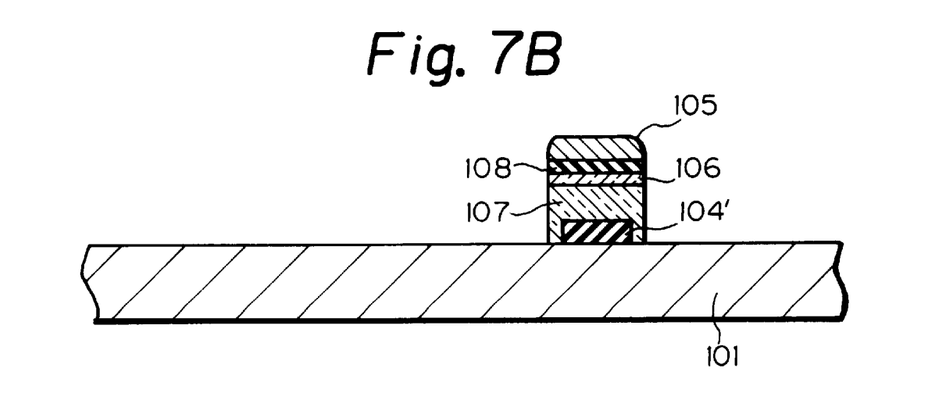

As shown in FIGS. 7A and 7B, in the second step, the SiN or similar insulating film 107 (300 nm thick), a-Si or similar semiconductor film 106 (300 nm thick) and $n^+$ type a-Si ($n^+$ a-Si) or similar contact layer 108 (50 nm thick) are sequentially formed on the substrate 101 by plasma CVD. Subsequently, the island 8 capable of covering at least the gate electrode and portion stated earlier is formed by photolithography and $n^+$ a-Si/a-Si/SiN dry etching.

Figure 8A:
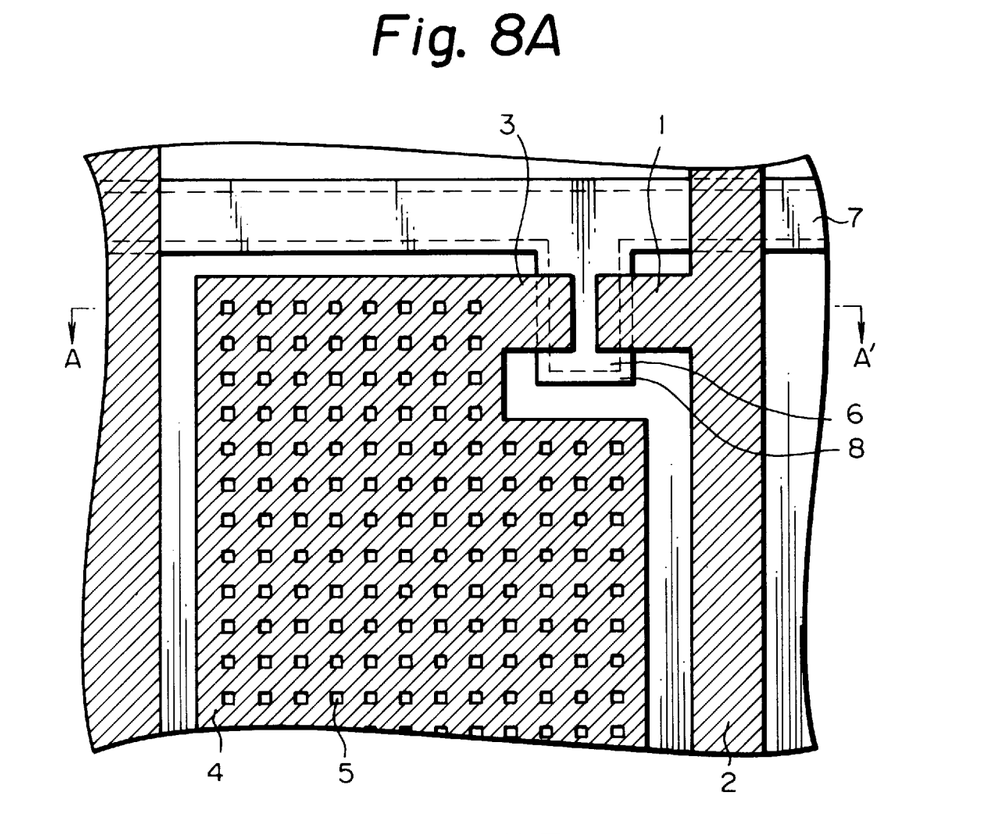
Figure 8B:
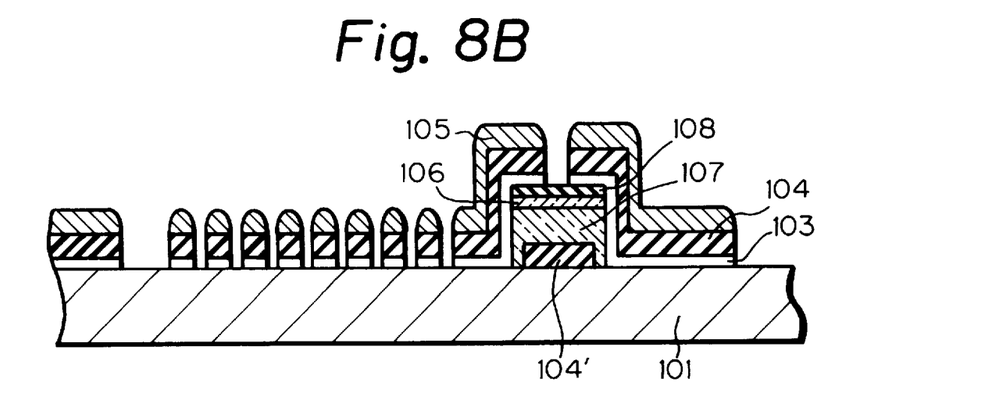
Figure 9A:
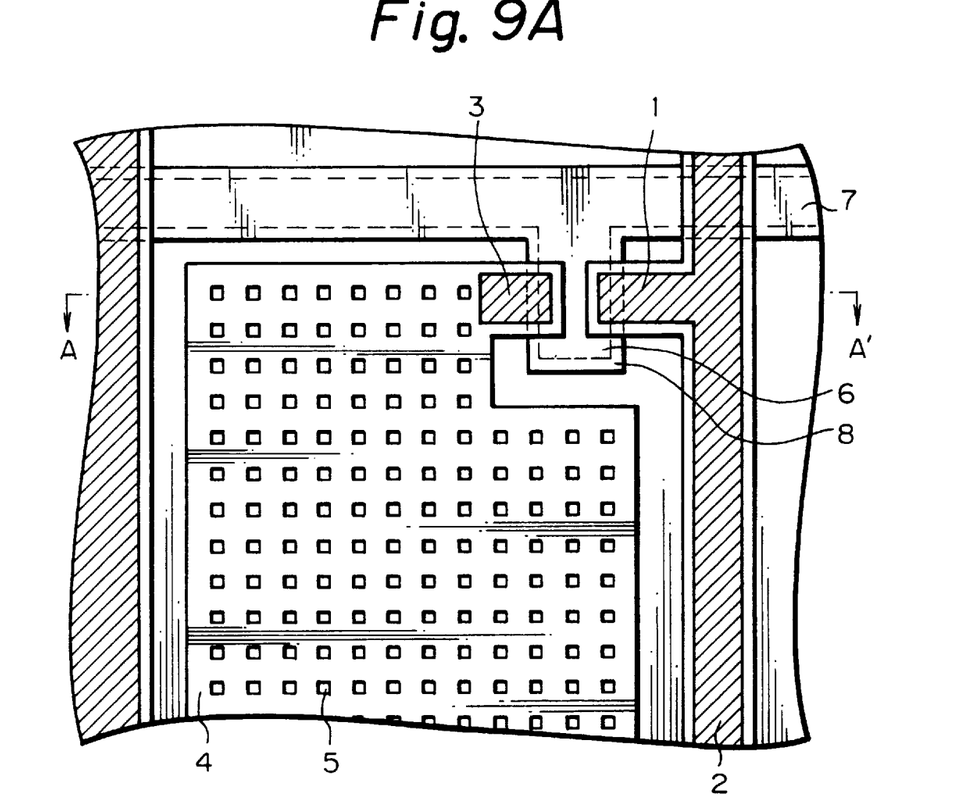
Figure 9B:
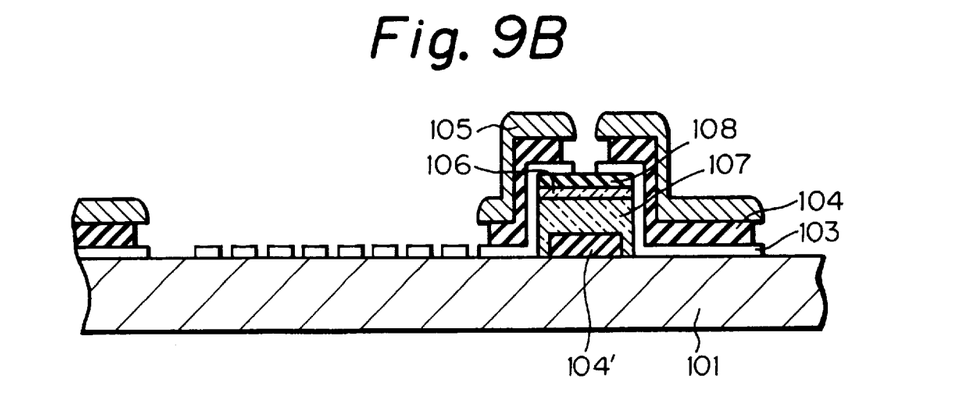

As shown in FIGS. 8A and 8B, in the third step, the ITO or similar transparent conductive film 103 (50 nm thick) and Cr or similar low resistance metal film 104 (150 nm) are formed on the substrate 101 by sputtering. Then, the drain electrode 1, drain bus line 2, source electrode 3 and pixel electrode 4 are formed by photolithography, Cr dry etching, and ITO dry etching. Again, the holes 5 formed in the pixel electrode 4 are 1 $\mu$m square each and spaced by 3 $\mu$m. Subsequently, as shown in FIGS. 9A and 9B, 1.5 $\mu$m side etching implemented by Cr wet etching is executed in order to remove Cr only from the pixel electrode 4. Finally, the contact layer 108 is removed from the channel portion by $n^+$ a-Si dry etching.

In this manner, the alternative embodiment produces an active matrix substrate circuit having low resistance wiring, reverse stagger type thin film transistors as switching devices by three consecutive of photolithography steps. A passivation film and/or a black matrix may also be added to the alternative embodiment.

In summary, in accordance with the present invention, a low resistance drain bus line and a transparent pixel electrode can be formed by a single photolithographic step. This successfully increases wiring resistance to be lowered without increasing the number of times of photography and can implement an LCD having a wide screen. This advantage is derived from a unique procedure in which, at the time of forming the drain bus line and pixel electrode, the present invention sequentially forms a transparent conductive film and a low resistance metal film, and removes the metal film by side etching via holes formed in the pixel electrode.

Various modifications will become possible for those skilled in the art after receiving the teachings of the present disclosure without departing from the scope thereof.

What is claimed is:

1. An active matrix LCD using thin film transistors as switching devices, comprising:

a drain electrode formed by a transparent conductive film and a low resistance metal film sequentially laminated in this order;

a drain bus line connected to said drain electrode;

a source electrode;

a pixel electrode connected to said source electrode and formed with a number of holes, said low resistance metal film being removed from said pixel electrode;

a gate electrode formed on said transparent conductive film and said low resistance metal film in a form of an island;

a gate bus line connected to said gate electrode; and a semiconductor layer and an insulation film identical in configuration with said gate bus line;

said gate bus line being formed of low resistance metal and connected to said gate electrode.

2. A method of producing an active matrix LCD, comprising the steps of:

(a) sequentially forming a transparent conductive film and a low resistance metal film on an insulative substrate in this order;

(b) forming a drain electrode, a drain bus line connected to said drain electrode, a source electrode, and a pixel electrode connected to said source electrode and formed with a number of holes;

(c) removing only said low resistance metal film from said pixel electrode by side etching;

(d) executing $PH_3$ plasma processing on said substrate, and then sequentially forming a semiconductor film, an insulating film and a low resistance metal film in this order;

(e) forming a gate electrode and a gate bus line connected to said gate electrode by patterning; and (f) forming an island identical in configuration with said gate electrode and said gate bus line.

3. An active matrix LCD using thin film transistors as switching devices, comprising:

a gate electrode implemented by a low resistance metal film;

a gate bus line connected to said gate electrode;

an insulating film, a semiconductor film and a contact layer formed on said low resistance metal film in a form of an island and so configured as to cover at least said gate electrode and a portion where said gate bus line and a drain bus line are expected to cross each other;

a transparent conductive film and a low resistance metal film sequentially laminated in this order in order to form a drain electrode connected to said drain bus line; and a pixel electrode connected to said source electrode and formed with a number of holes, only said low resistance metal film being removed from said pixel electrode.

4. A method of producing an active matrix LCD, comprising the steps of:

(a) forming a low resistance metal film on an insulative substrate;

(b) forming a gate electrode and a gate bus line connected to said gate electrode by patterning;

(c) forming an insulating film, a semiconductor film and a contact layer on said substrate;

(d) forming by patterning an island covering at least said gate electrode and a portion where said gate bus line and a drain bus line are expected to cross each other;

(e) sequentially forming a transparent conductive film and a low resistance metal film on said substrate in this order;

(f) forming by patterning said drain bus line connected to said drain electrode, a source electrode, and a pixel electrode connected to said source electrode and formed with a number of holes;

(g) removing only said low resistance metal film from said pixel electrode by side etching; and (h) removing said contact layer from a channel portion.

5. The LCD of claim 1, wherein said pixel electrode further comprises an interior region defined by a perimeter of said pixel electrode, and substantially all of the interior region comprises a matrix of regularly spaced-apart holes.

6. The LCD of claim 1, wherein said holes are substantially square.

7. The LCD of claim 1, wherein said low resistance metal film has an edge set back from an edge of said transparent conductive film by a distance equal to 150% of a length of an edge of one of said holes.

8. The LCD of claim 7, wherein the distance of the set back is 1.5 microns and the length of the hole edge is 1 micron.

9. The LCD of claim 1, wherein a length of an edge of each of said holes is ⅓ a distance the holes are spaced apart.

10. The LCD of claim 9, wherein the length of the hole edges is 1 micron and the distance the holes are spaced apart is 3 microns.

11. The LCD of claim 3, wherein said pixel electrode further comprises an interior region defined by a perimeter of said pixel electrode, and substantially all of the interior region comprises a matrix of regularly spaced-apart holes.

12. The LCD of claim 3, wherein said holes are substantially square.

13. The LCD of claim 3, wherein said low resistance metal film has an edge set back from an edge of said transparent conductive film by a distance equal to 150% of a length of an edge of one of said holes.

14. The LCD of claim 13, wherein the distance of the set back is 1.5 microns and the length of the hole edge is 1 micron.

15. The LCD of claim 3, wherein a length of an edge of each of said holes is ⅓ a distance the holes are spaced apart.

16. The LCD of claim 13, wherein the length of the hole edges is 1 micron and the distance the holes are spaced apart is 3 microns.

* * * * *